United States Patent Office 2,945,859
Patented July 19, 1960

2,945,859
DIAMINOQUINAZOLINES AND METHOD OF MAKING

George H. Hitchings, Yonkers, and Elvira A. Falco and Kurt W. Ledig, New Rochelle, N.Y., assignors to Burroughs Wellcome & Co. (U.S.A.) Inc., Tuckahoe, N.Y., a corporation of New York No Drawing. Filed Dec. 15, 1958, Ser. No. 780,220

9 Claims. (Cl. 260—256.4)

The present invention relates to new derivatives of 2,4-diaminoquinazoline. It has been found that substitution by alkyl groups in certain positions of the benzene moiety markedly enhances the antibacterial activity of 2,4-diaminoquinazoline resulting in compounds with outstanding properties as inhibitors of bacteria. The bacterial spectrum inhibited includes a number of pathogenic organisms such as *Escherichia coli*, *Salmonella typhosa* and *Staphylococcus aureus*, but the new substances are particularly noteworthy for their action on such a troublesome organism as *Proteus vulgaris* and in some instances on *Pseudomonas aeruginosa*. Exemplification of these activities is shown in the table below which sets forth the zones of inhibition produced on seeded agar plates by the application of filter paper disks which had been dipped in solutions of the compounds (concentration: 1 mg./ml.). It will be noted that the parent 2,4-diaminoquinazoline is essentially inactive when tested by this method, showing only a slight inhibition of *E. coli*. This application is a continuation-in-part of our pending application Serial No. 574,590, filed March 29, 1956.

TABLE I

Zones of inhibition produced by alkyldiaminoquinazolines

| Substituents | | | Organisms | | | | | |
|---|---|---|---|---|---|---|---|---|
| $R_1$ | $R_2$ | X | S.a. | E.c. | S.t. | B.s. | P.v. | Ps.a. |
| | | | Diameter of Zone (mm.) | | | | | |
| $CH_3$ | H | H | 0 | 25.5 | 27 | 28.5 | 22 | 0 |
| $C_2H_5$ | H | H | 0 | 31.5 | 35.5 | 33.5 | 29.5 | 0 |
| H | $CH_3$ | H | 27 | 21 | 26 | 17 | 22 | 0 |
| H | $C_2H_5$ | H | 28 | 28 | 28 | 25 | 25 | ---- |
| H | $C_3H_7$ | H | 30 | 33 | 0 | 38 | 28 | 0 |
| —$(CH_2)_4$— | | H | 0 | 34 | 38 | 40 | 32 | 12 |
| —$(CH_2)_3$— | | H | 16.5 | 35 | 42 | 40 | 33 | 15 |
| H | $CH_3$ | 8-$CH_3$ | 20 | 20 | 26 | 19 | 20 | 0 |
| H | $CH_3$ | 7-$CH_3$ | 22 | 0 | 0 | 17 | ---- | ---- |
| H | H | H | 0 | 17 | 0 | 0 | ---- | ---- |

S.a.=Staphylococcus aureus. E.c.=Escherichia coli. S.t.=Salmonella typhosa. B.s.=Bacillus subtilis. P.v.=Proteus vulgaris. Ps.a.=Pseudomonas aeruginosa.

A number of applications of these findings will be apparent to those versed in the art. Thus, solutions of the above named compounds are potent antibacterials for topical use—the compounds being used as their soluble salts in concentrations of the order of 0.01 to 1%. The compounds are suitable for use alone or in combination with antibiotics and/or other antibacterial agents.

*In vivo experiments against Proteus infections*

Seven groups of five white mice each weighing approximately 27 g. each were inoculated intraperitoneally with 0.5 ml. of a 1:50 dilution of a 6 hour culture of *Proteus vulgaris* CN329. Test drugs were administered orally in the doses indicated in the table below immediately before inoculation, and the mice were observed for 160 hours. The results are tabulated in terms of average survival time for each group. It will be observed that controls treated with water survived an average of only 46 hours, those treated with sulfadiazine an average of 68 hours. 2,4-diamino-5,6-dimethylenequinazoline at a dose of 0.25 mg. gave significant protection alone and potentiative effects when administered with sulfadiazine. The 5-ethylquinazoline derivative, while less active when given alone, afforded complete protection when given with sulfadiazine.

*Protective effects of quinazolines against Proteus infections*

| | Dose | Average Survival, hours |
|---|---|---|
| 1. Water | 0.25 ml | 46 |
| 2. Sulfadiazine | 0.25 mg | 68 |
| 3. 2,4-Diamino-5,6-trimethylene-quinazoline | 0.25 mg | 105 |
| 4. 2,4-Diamino-5,6-trimethylene-quinazoline Sulfadiazine | {0.05<br>{0.25 | 126 |
| 5. 2,4-Diamino-5,6-trimethylene-quinazoline Sulfadiazine | {3(0.25)<br>{2(0.25)mg | 160 |
| 6. 2,4-Diamino-5-ethylquinazoline | 1.0 mg | 71 |
| 7. 2,4-Diamino-5-ethylquinazoline Sulfadiazine | {0.5<br>{0.25 | 160 |

The compounds of the present invention can be represented by the following formula:

wherein $R_1$ and $R_2$ are selected from the group consisting of hydrogen and lower alkyl, providing at least one is alkyl and both together may represent a divalent radical of the group consisting of trimethylene and tetramethylene.

These new compounds may be made by the chlorination and amination of a suitable 2,4-dihydroxyquinazoline as shown below:

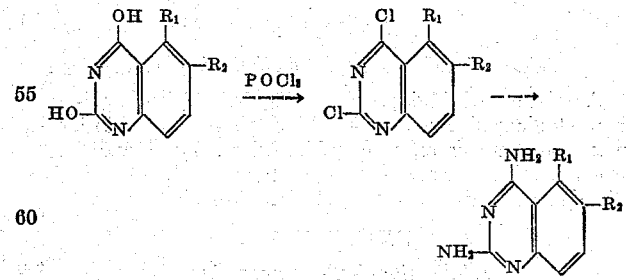

Alternatively they may be prepared by the reaction of a suitably substituted anthranilonitrile with dicyandiamide as follows:

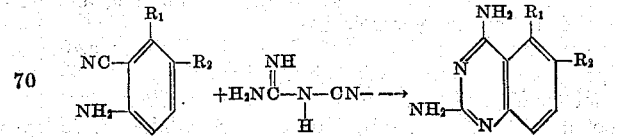

The selection of the particular method depends on the reactivities of the individual compounds. However, it has been found that the second method is a general method which can be used for all of the examples given below.

EXAMPLE 1

2,4-diamino-6-methylquinazoline

A mixture of 13 g. of 6-methyl-2,4-dihydroxyquinazoline, 40 g. of phosphorus pentachloride and 80 ml. of phosphoryl chloride was heated under reflux conditions for 3 hours. The excess phosphoryl chloride was removed under reduced pressure and the residue poured over cracked ice and made alkaline with ammonium hydroxide. The precipitate was filtered off and heated with 200 ml. of saturated alcoholic ammonia at 150° for 17 hours. The reaction mixture was evaporated to dryness, dissolved in dilute acetic acid and the product reprecipitated by ammonium hydroxide, then recrystallized from benzene.

EXAMPLE 2

2,4-diamino-6-ethylquinazoline

A mixture of 8 g. of 6-ethyl-2,4-dihydroxyquinazoline and 300 ml. of phosphoryl chloride was heated under reflux conditions for 33 hours. The excess phosphoryl chloride was removed under reduced pressure. The residue was mixed with 400 ml. dry chloroform and dry ammonia gas was passed in, with cooling, until there was a permanent excess of ammonia. The chloroform was evaporated and the residue was heated with 200 ml. of saturated ethanolic ammonia at 145° for 48 hours. The reaction mixture was evaporated to dryness, dissolved in dilute acetic acid and the product reprecipitated with ammonium hydroxide. The 2,4-diamino-6-ethylquinazoline after recrystallization from water and then benzene had a melting point of 214–216°.

EXAMPLE 3

2,4-diamino-6,8-dimethylquinazoline

A mixture of 18 g. of 2,4-dihydroxy-6,8-dimethylquinazoline, 54 ml. of phosphoryl chloride and 8 ml. dimethylaniline was heated for 5½ hours under reflux conditions and then worked up as in Example 2. The 2,4-diamino-6,8-dimethylquinazoline was recrystallized from boiling water.

EXAMPLE 4

2,4-diamino-6,7-dimethylquinazoline

The chlorination and amination of 2,4-dihydroxy-6,7-dimethylquinazoline was carried out as described in Example 1. The product was finally recrystallized from methanol and gave a melting point of 291°.

EXAMPLE 5

2,4-diamino-5-isopropyl-8-methylquinazoline

A mixture of 11.6 g. of 2,4-dihydroxy-5-isopropyl-8-methylquinazoline and 300 ml. of phosphoryl chloride was heated under reflux conditions for 5 hours and the reaction mixture worked up as in Example 3. The 2,4-diamino derivative was recrystallized from hot water.

EXAMPLE 6

2,4-diamino-6-ethylquinazoline

Five grams of the β-oxime of 5-ethylisatin was heated in an oil bath to 210°. At this temperature, decomposition took place and the 5-ethyl anthranilonitrile distills over. The distillate was dissolved in absolute ether and precipitated as the hydrochloride.

One and one-tenth grams of 2-amino-5-ethylbenzonitrile HCl was thoroughly mixed with 0.6 gram of dicyanidiamide and heated to 150° C. and the temperature kept at 150—160° for 5 minutes. The addition of 15 ml. of concentrated hydrochloric acid dissolves the reaction mixture which after boiling for 5 minutes was poured over ice and made alkaline with sodium hydroxide. The precipitate was filtered, washed and recrystallized from water. The melting point of 2,4-diamino-6-ethylquinazoline is 223–224°.

EXAMPLE 7

2,4-diamino-5,6-trimethylenequinazoline

Twelve grams of 4-bromo-5-acetylaminoindane and 5 grams of cuprous cyanide were refluxed in 13 ml. of pyridine for 5 hours. The reaction mixture was poured into 50 ml. of 7 N ammonium hydroxide and extracted with a mixture of 100 ml. ether and 100 ml. of benzene. The organic layer was washed with three times 35 ml. of diluted ammonium hydroxide followed by two times 35 ml. of 2 N hydrochloric acid and finally with water. After drying over calcium sulfate, the ether-benzene mixture was filtered and evaporated to 75 ml. The product, 4 cyano-5-acetylaminoindane crystallized out and was collected. It melted at 137–138°.

Four and five-tenths grams of 5-acetylamino-4-cyanoindane was dissolved in 100 ml. absolute alcohol containing 2 grams of sodium methoxide and refluxed overnight. The reaction mixture was poured over ice in the presence of sufficient acetic acid to neutralize the sodium hydroxide. The 4-cyano-5-aminoindane was extracted with ether and precipitated as the hydrochloride from this solution.

Three and four-tenths grams of 5-amino-4-cyanoindane hydrochloride was thoroughly mixed with 2 g. dicyandiamide and fused at 160–165° for 15 minutes. The reaction mixture was then dissolved in 50 ml. concentrated hydrochloric acid, poured over ice and made alkaline with sodium hydroxide. The precipitate was washed and recrystallized from alcohol. This product then was dissolved in very dilute formic acid and put through a Dowex-1 (formate) column. The effluent was neutralized and the crystalline 2,4-diamino-5,6-trimethylenequinazoline collected. The melting point was 288°.

EXAMPLE 8

2,4-diamino-5-methylquinazoline 2-amino-6-methylbenzonitrile was prepared as described in example 6 using 4-methylisatin.

Six grams of 6-methylanthranilonitrile was thoroughly mixed with 6 grams of dicyandiamine and fused at 150–160° for 15 minutes in an oil bath. The reaction mixture was dissolved in 150 ml. of water, cooled and made alkaline with sodium hydroxide. The resulting 2,4-diamino-5-methylquinazoline, after recrystallization from water, melted at 212–213°.

EXAMPLE 9

2,4-diamino-6-propylquinazoline

Eight grams of 2-amino-5-propylbenzonitrile was prepared through decomposition of the corresponding β-isatin oxime.

Eight grams of 5-propyl-2-aminobenzonitrile hydrochloride was thoroughly mixed with 3.3 grams of dicyandiamide and worked up as in Example 6. The crude 2,4-diamino-6-propylquinazoline was recrystallized from water. It melted at 194–195°.

EXAMPLE 10

2,4-diamino-6-butylquinazoline

Four grams of 5-n-butylisatin-β-oxime was decomposed at 235°. The resultant 2-amino-5-butylbenzonitrile was dissolved in ether and the hydrochloride precipitated.

One and six-tenths grams of 2-amino-5-butylbenzonitrile HCl was fused with 650 mg. of dicyandiamide at 155° for 10 minutes. The reaction mixture was dissolved by the addition of 30 ml. of concentrated hydrochloric acid and 20 ml. of alcohol. After being poured over ice, it was made alkaline with sodium hydroxide. The precipitate was recrystallized from water. 2,4-diamino-6-butylquinazoline melted at 191–192°.

EXAMPLE 11

*2,4-diamino-5,6-tetramethylenequinazoline*

Twelve grams of 4,5-tetramethyleneisatin-β-oxime was decomposed as in Example 6. The hydrochloride of the 2-amino-1-cyanotetralin was precipitated and collected. Three and five-tenths grams of 2-amino-1-cyanotetralin was thoroughly mixed with 1.5 grams of dicyandiamide and fused at 165° for 10 minutes. The reaction mixture was treated as in Example 6 and the crude 2,4-diamino-5,6-tetramethylenequinazoline recrystallized from formamide with the addition of water. The compound melted at 240° C.

EXAMPLE 12

*2,4-diamino-5,6,8-trimethylquinazoline*

Three and eight-tenths grams of 4,5,7-trimethylisatin-β-oxime was decomposed at 240°. The distillate was dissolved in ether and the 2-amino-3,5,6-trimethylbenzonitrile precipitated as the hydrochloride.

Eight hundred mg. of 2-amino-3,5,6-trimethylbenzonitrile was fused with 300 mg. of dicyandiamide at 170° for 10 minutes. The reaction mixture was treated as in Example 6 and the crude product recrystallized from water. 2,4 - diamino - 5,6,8 - trimethylquinazoline has a melting point of 198–200°.

EXAMPLE 13

*2,4-diamino-5-ethylquinazoline*

Four and eight-tenths grams of the β-oxime of 4-ethylisatin was decomposed and the distillate after being dissolved in ether was precipitated as the hydrochloride.

One and eight-tenths grams of 2-amino-6-ethylbenzonitrile was thoroughly mixed with 850 mg. of dicyandiamide and heated at 155° for 5 minutes. The reaction mixture was dissolved in concentrated hydrochloric acid and the compound precipitated with sodium hydroxide. After repeated recrystallization from water, the 2,4-diamino-5-ethylquinazoline was obtained as a white crystalline material.

What we claim is:
1. 2,4-diamino-5-ethylquinazoline.
2. 2,4-diamino-5,6-trimethylenequinazoline.
3. A method for preparing a compound of the formula

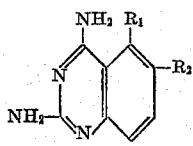

wherein $R_1$ and $R_2$ are selected from the class consisting of lower alkyl and hydrogen and both together represent a divalent radical of the group consisting of the trimethylene and tetramethylene radicals, which consists of the reaction of an anthranilonitrile of the formula

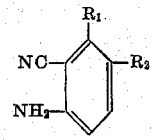

wherein $R_1$ and $R_2$ have the above values, with dicyandiamide followed by recovery of the diaminoquinazoline.

4. 2,4-diamino-5-methylquinazoline.
5. 2,4-diamino-6-methylquinazoline.
6. 2,4-diamino-6-ethylquinazoline.
7. 2,4-diamino-6-propylquinazoline.
8. A compound selected from the class consisting of

A.

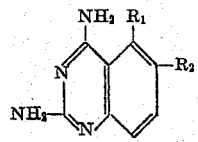

and

B.

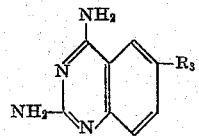

wherein $R_1$ is lower alkyl, $R_2$ is selected from the class consisting of lower alkyl and hydrogen and wherein $R_1$ and $R_2$ together constitute a cycloalkyl chain of from three to four carbon atoms and $R_3$ is a lower alkyl group.

9. 2,4-diamino-6-tetramethylenequinazoline.

References Cited in the file of this patent

UNITED STATES PATENTS

| | | |
|---|---|---|
| 1,817,982 | Hentrich et al. | Aug. 11, 1931 |
| 2,211,710 | Zerweck et al. | Aug. 13, 1940 |